United States Patent
Bhatt et al.

(10) Patent No.: US 9,306,468 B2
(45) Date of Patent: Apr. 5, 2016

(54) SYNCHRONIZED ISOLATED AC-AC CONVERTER WITH VARIABLE REGULATED OUTPUT VOLTAGE

(71) Applicant: DET International Holding Limited, George Town, Grand Cayman (KY)

(72) Inventors: Malhar Bhatt, Freiburg (DE); Nigel Springett, Emmendingen (DE); Wolfgang Bitsch, Wyhl (DE)

(73) Assignee: DET INTERNATIONAL HOLDING LIMITED, George Town, Grand Cayman (KY)

( * ) Notice: Subject to any disclaimer, the term of this patent is extended or adjusted under 35 U.S.C. 154(b) by 216 days.

(21) Appl. No.: 13/924,059

(22) Filed: Jun. 21, 2013

(65) Prior Publication Data
US 2013/0343102 A1   Dec. 26, 2013

(30) Foreign Application Priority Data
Jun. 22, 2012   (EP) .................................... 12405060

(51) Int. Cl.
  *H02M 5/458* (2006.01)
  *H02M 5/22* (2006.01)
  *H02M 1/00* (2007.01)

(52) U.S. Cl.
  CPC .............. *H02M 5/458* (2013.01); *H02M 5/225* (2013.01); *H02M 2001/0025* (2013.01)

(58) Field of Classification Search
  CPC ....................................................... H02M 5/458
  See application file for complete search history.

(56) References Cited

U.S. PATENT DOCUMENTS

| | | | | |
|---|---|---|---|---|
| 5,266,894 | A | * | 11/1993 | Takagi et al. ............. 324/762.01 |
| 5,598,326 | A | * | 1/1997 | Liu et al. .......................... 363/34 |
| 6,847,515 | B1 | * | 1/2005 | Kelley et al. .................. 361/160 |
| 2007/0008745 | A1 | * | 1/2007 | Joshi et al. ................. 363/21.01 |
| 2007/0035971 | A1 | * | 2/2007 | Yasumura .................. 363/21.02 |
| 2009/0121675 | A1 | * | 5/2009 | Ho et al. ....................... 320/108 |
| 2009/0167256 | A1 | * | 7/2009 | Maddali et al. ................. 322/25 |
| 2009/0190378 | A1 | * | 7/2009 | Ishii et al. .................. 363/21.01 |
| 2010/0033996 | A1 | | 2/2010 | Kono |
| 2011/0305049 | A1 | * | 12/2011 | Raptis et al. .................... 363/34 |
| 2012/0170165 | A1 | * | 7/2012 | Jung et al. ....................... 361/86 |
| 2013/0039104 | A1 | * | 2/2013 | Sharma ........................ 363/123 |

FOREIGN PATENT DOCUMENTS

EP   0 762 623 A2   3/1997
EP   2 244 369 A1   10/2010

OTHER PUBLICATIONS

European Search Report, mailed Feb. 28, 2013, issued in European Patent Application 12 40 5060.
Lee et al., "TRIAC Dimmable Electronic Ballast with Lamp Power Equalization", 35th Annual IEEE Power Electronics Specialists Conference, vol. 3, pp. 1754-1760, Jun. 20, 2004.

* cited by examiner

*Primary Examiner* — Emily P Pham
(74) *Attorney, Agent, or Firm* — Birch, Stewart, Kolasch & Birch, LLP

(57) ABSTRACT

In an AC-AC converter comprising a primary side, a secondary side and a regulator, wherein the regulator comprises a voltage regulation circuit configured to determine an error voltage based on an at least partially alternating feedback voltage fed into the regulator from the secondary side of the AC-AC converter and to supply this error voltage and/or an information about this error voltage to the primary side of the AC-AC converter, the regulator comprises an averaging circuit configured to determine an average DC voltage based on the feedback voltage.

23 Claims, 2 Drawing Sheets

SYNCHRONIZED ISOLATED AC-AC CONVERTER WITH VARIABLE REGULATED OUTPUT VOLTAGE

TECHNICAL FIELD

The invention relates to AC-AC converters comprising a primary side, a secondary side and a regulator, wherein the regulator comprises a voltage regulation circuit configured to determine an error voltage based on a feedback voltage fed into the regulator from the secondary side of the AC-AC converter and to supply this error voltage and/or an information about this error voltage to the primary side of the AC-AC converter.

BACKGROUND ART

In certain technical applications, for example but not exclusively printers, heaters or lamps, there is a need for AC-AC converters which are able to supply output voltages of variable amplitudes which otherwise follow the sinusoidal waveform of the utility mains, especially in terms of phase and frequency.

There are techniques such as phase angle control or integral cycle control which are typically used in alternating current networks to provide regulated output voltage.

The disadvantage with the phase angle control method is that the utility mains current contains harmonics which are not present in the utility mains voltage. Other loads, which are connected to the utility mains, suffer from these negative effects of the harmonics generated. In order to filter these harmonics, one needs to use very large filter circuit components making the overall solutions bulky and causing more electric losses. The European Standards EN61000-3-2 and EN61000-3-4 regulate the necessary limitation of mains harmonics.

The disadvantage with the integral cycle control is that it utilizes full-wave or half-wave packet control and loads the utility mains network periodically. This periodic loading of the utility mains network creates fluctuations in the utility mains voltage producing the so-called flicker effect. The European Standard EN61000-3-3 regulates the necessary limitation of mains flicker.

Typical loads which can cause problems in terms of harmonics and flicker to power networks are heating elements formed by ohmic resistors or inductive loads as present in motors or filter circuits. Such loads can also be a printer power supplies which may be not fulfilling the safety standards and so cannot be directly connected to mains and therefore require an isolated power source. Also, such printer loads are typically fast changing and need a regulation that should ideally be able to provide the steady output voltage even during the printing of pages.

Especially for such printers, there is a need to produce an output voltage, which does not create harmonics and flicker, thereby reducing the filter size and the losses. Also what is needed here is to produce an isolated output voltage which is regulated, synchronized with the utility mains voltage and has the same frequency as the utility mains voltage.

SUMMARY OF THE INVENTION

It is the object of the invention to create an AC-AC converter pertaining to the technical field initially mentioned, that does not create flicker and harmonics, that is as energy-efficient and as small as possible and that is able to produce a regulated output voltage synchronized with the utility mains voltage in terms of phase and frequency.

The solution of the invention is specified by the features of claim 1. According to the invention, in an AC-AC converter with a primary side, a secondary side and a regulator, wherein the regulator comprises a voltage regulation circuit configured to determine an error voltage based on an at least partially alternating feedback voltage fed into the regulator from the secondary side of the AC-AC converter and to supply this error voltage and/or an information about this error voltage to the primary side of the AC-AC converter, the regulator further comprises an averaging circuit configured to determine an average DC voltage based on the feedback voltage.

This has the advantage that an information on the quality of the output voltage of the AC-AC converter on its secondary side can conveniently be fed back to the primary side which can then take appropriate action in case the quality of the output voltage of the AC-AC converter on its secondary side is not sufficient. A particular advantage of the averaging circuit is that it forms a buffer between the voltage regulation circuit and the secondary side of the AC-AC converter.

In a preferred embodiment, the regulator comprises a fast reaction circuit configured to help the voltage regulation circuit to react to rapid load changes, in particular in overshoot situations of the AC-AC converter. Such a fast reaction circuit has the advantage that a comparably long time constant of the averaging circuit is less critical and overvoltage shutdowns of the AC-AC converter can be avoided. However, the presence of a fast reaction circuit is not absolutely necessary: it is also possible to construct the averaging circuit in such a way that different time constants can be applied depending on the load dynamics and on how quickly a reaction of the regulator has to occur. It is also possible to combine both possibilities, that is to use a regulator with a fast reaction circuit and different possible time constants in the averaging circuit. The fast reaction circuit typically comprises at least an operational amplifier and/or a voltage source as a reference as well as, preferably, a diode and/or a Zener-diode and/or a resistance and/or a capacitor.

In a preferred embodiment, an output of the fast reaction circuit is connected to an output of the averaging circuit and/or to an input of the voltage regulation circuit. This means that the fast reaction circuit is preferably mounted in parallel with the averaging circuit, seen from the voltage regulation circuit and/or secondary ground of the AC-AC converter. The advantage of this particular setup of the fast reaction circuit is that the intervention of the fast reaction circuit is always possible but will not necessarily occur at all times. It is of course also possible to set up the fast reaction circuit differently, for example in series with the averaging circuit or with its output connected to another point of the regulator. In typical embodiments, the fast reaction circuit is configured to charge a capacitor in the averaging circuit. This has the advantage to help the voltage regulation circuit to react in a fast manner.

In a typical embodiment, the regulator comprises a current regulation circuit configured to determine an error current based on a load current fed into the regulator from a secondary side of the AC-AC converter and to supply this error current and/or an information about this error current to a primary side of the AC-AC converter, preferably only in overload situations. This setup of a current regulation circuit has the advantage that it can realize a short circuit protection for the AC-AC converter which typically only comes into action in situations where the load current of the AC-AC converter becomes too high. However, short circuit protection can also be realized in different manners for the example by using fuses. A current regulation circuit according to the invention preferably comprises at least an operational amplifier and/or a voltage source, typically as a reference, as well as, preferably, a diode and/or a resistance and/or a capacitor.

In a particularly preferred embodiment, an output of the current regulation circuit is connected to an output of the voltage regulation circuit. This typically means that the current regulation circuit is connected in parallel with the voltage regulation circuit and/or the averaging circuit and/or the fast reaction circuit. The advantage of such a setup is that it is particularly easy to guarantee that the current regulation series only comes into action when necessary. It is however also possible to connect the output of the current regulation circuit to another point of the regulator network, for example to the input of the voltage regulation circuit.

In a preferred embodiment, the regulator comprises an opto-coupler circuit for maintaining a galvanic isolation between the regulator and/or the secondary side of the AC-AC converter from the primary side of the converter. This opto-coupler circuit typically comprises an opto-coupler. An input of the opto-coupler is preferably connected to the output of the voltage regulation circuit and/or to the output of the current regulation circuit, preferably via a divider also present in the opto-coupler circuit which is typically set up by two resistances. An information about the error voltage of the voltage regulation circuit and/or an information about the error current of the current regulation circuit can therefore be transmitted to the primary side of the AC-AC converter whereby a galvanic isolation is maintained. The communication between the regulator and the primary side of the AC-AC converter does, however, not necessarily have to be via opto-coupler: any kind of connection (e. g. wireless network or Bluetooth) would also be possible as long as a galvanic isolation between the secondary side and the primary side of the AC-AC converter is achieved. If the galvanic isolation is implemented at another point of the regulator, then it does not necessarily be present between the output of the regulator and the primary side of the AC-AC converter.

In a preferred embodiment the AC-AC converter comprises a rectifier on its primary side. This has the advantage that only half waves of the same polarity are present on the primary side after the rectifier which simplifies any subsequent switching architecture at other points of the AC-AC converter. It is, however, also possible to not use a rectifier on the primary side of the AC-AC converter but to work with bidirectional waveforms throughout the AC-AC converter or at least on its primary side. The rectifier is typically a bridge rectifier, preferably a full bridge rectifier.

In a typical embodiment, the AC-AC converter comprises a polarity changer on its secondary side. The polarity changer typically comprises four switches, preferably MOSFETs, preferably in full bridge connection.

The four switches of the polarity changer are preferably operated by a gate drive that is synchronized with a mains input voltage (also referred to as utility mains) of the AC-AC converter. The advantage of such a mains-synchronized polarity changer on the secondary side of the AC-AC converter is that an output voltage in phase with the utility mains can easily be obtained in this way. However, it is also possible to use other techniques to keep the output voltage in phase with the utility mains, for example by using phase angle control or integral cycle control.

In a particularly preferred embodiment, the AC-AC converter comprises a resonant half bridge. The resonant half bridge typically comprises a transformer, at least one inductor, and at least one resonant capacitor as well as two switches, which are typically operated by a half-bridge driver.

The advantages of such a resonant half bridge are typically high efficiency and high power density. However, the use of a resonant half bridge is not absolutely necessary, other types of transformer structures could also be used.

In a preferred embodiment, the resonant half bridge comprises a high frequency transformer, i. e. a transformer that is specially designed to operate at frequencies of 40 kHz and higher, preferably 100 kHz and higher. Such a transformer has the advantage to improve the energy-efficiency of the resonant half bridge and the AC-AC converter. It is of course also possible to use a standard transformer in the resonant half bridge.

In a typical embodiment, the resonant half bridge comprises a high frequency switch, i. e. a switch that is designed to operate at frequencies of 40 kHz or more, preferably 100 kHz or more. Preferably, the resonant half bridge comprises two high frequency switches which are typically MOSFETs. The switches are preferably driven by a control structure providing a fixed duty cycle. The advantage of using such high frequency switches is that the energy-efficiency of the resonant half bridge and the AC-AC converter are improved.

In a particularly preferred embodiment, the resonant half bridge comprises a voltage doubler configuration on its secondary side and/or on the secondary side of the high frequency transformer. The voltage doubler configuration preferably comprises two diodes and/or two capacitors. Such a voltage doubler configuration has the advantage that it is not necessary to foresee any tapped secondary winding in the high frequency transformer. Imbalances caused by different leakage inductances are thereby avoided. The capacitors of the voltage doubler configuration typically have capacitances in the range of 0.1 to 250 µF, preferably around 1 µF.

In a preferred embodiment, the AC-AC converter comprises a step down converter with a step down switch and preferably a continuity inductor and/or a step down diode. Such a step down converter is typically configured to switch at much higher frequencies than the frequency of the utility mains, for example at 40 kHz or higher, preferably at frequencies between 50 kHz and 500 kHz, more preferably between 100 kHz and 250 kHz. The step down converter is typically located between the rectifier and the resonant half bridge on the primary side of the AC-AC converter. The use of such a step down converter has the advantage that a variable modification of the amplitude of the output voltage of the AC-AC converter can easily be obtained by commanding the step down switch in a variable manner. However, the use of a step down converter is not absolutely mandatory: other types of choppers or DC-DC converters could also be used for the purpose of modifying the amplitude of the voltage fed to the resonant half bridge.

In a particularly preferred embodiment, an output of the regulator is connected to the step down switch such that the step down switch can be commanded by the regulator. This has the advantage that regulator can influence the switching of the step down converter and thereby—at least indirectly—the amplitude of the output voltage available on the secondary side of the AC-AC converter. It is particularly preferred that the step down converter is connected to the output of the opto-coupler and is therefore operated by the information transmitted to the primary side of the AC-AC converter by the opto-coupler.

In a typical method for operating an AC-AC converter according to the invention, a bidirectional input sine wave, also referred to as utility mains, is converted to a unidirectional rectified sine wave, preferably a bridge rectifier.

The unidirectional rectified sine wave is then converted to a regulated unidirectional sine wave voltage, preferably by means of a step down converter. The step down controller is regulated by a regulator which determines an error voltage depending on a reference voltage tapped on the secondary side of the AC-AC converter and a voltage reference. This regulated unidirectional sine wave voltage typically serves as an input for a resonant half bridge. The regulated unidirectional sine wave voltage is transformed to a unidirectional sine wave output voltage with variable amplitude, typically by means of at least one high frequency switch and a high frequency transformer in the resonant half bridge. The unidirectional sine wave output voltage is then converted to an unfiltered bidirectional sine wave output voltage having the same frequency as the bidirectional input sine wave, preferably by means of an inverter bridge. Then, the unfiltered bidirectional sine wave output voltage is transformed by means of a low pass filter in order to obtain a bidirectional output sine wave that is in phase with the utility mains and of variable amplitude.

Other advantageous embodiments and combinations of features come out from the detailed description below and the totality of the claims.

BRIEF DESCRIPTION OF THE DRAWINGS

The drawings used to explain the embodiments show:
FIG. 1 shows a schematic wiring diagram of an AC-AC converter C according to the invention. A utility mains 1 is the power source to the input of the AC-AC converter C. The alternating current supplied by the utility mains 1 is cycled through the low pass filter 2 which serves for filtering electromagnetic interference noise. The utility mains typically has a frequency of 40 Hz to 60 Hz.

Figure 1:
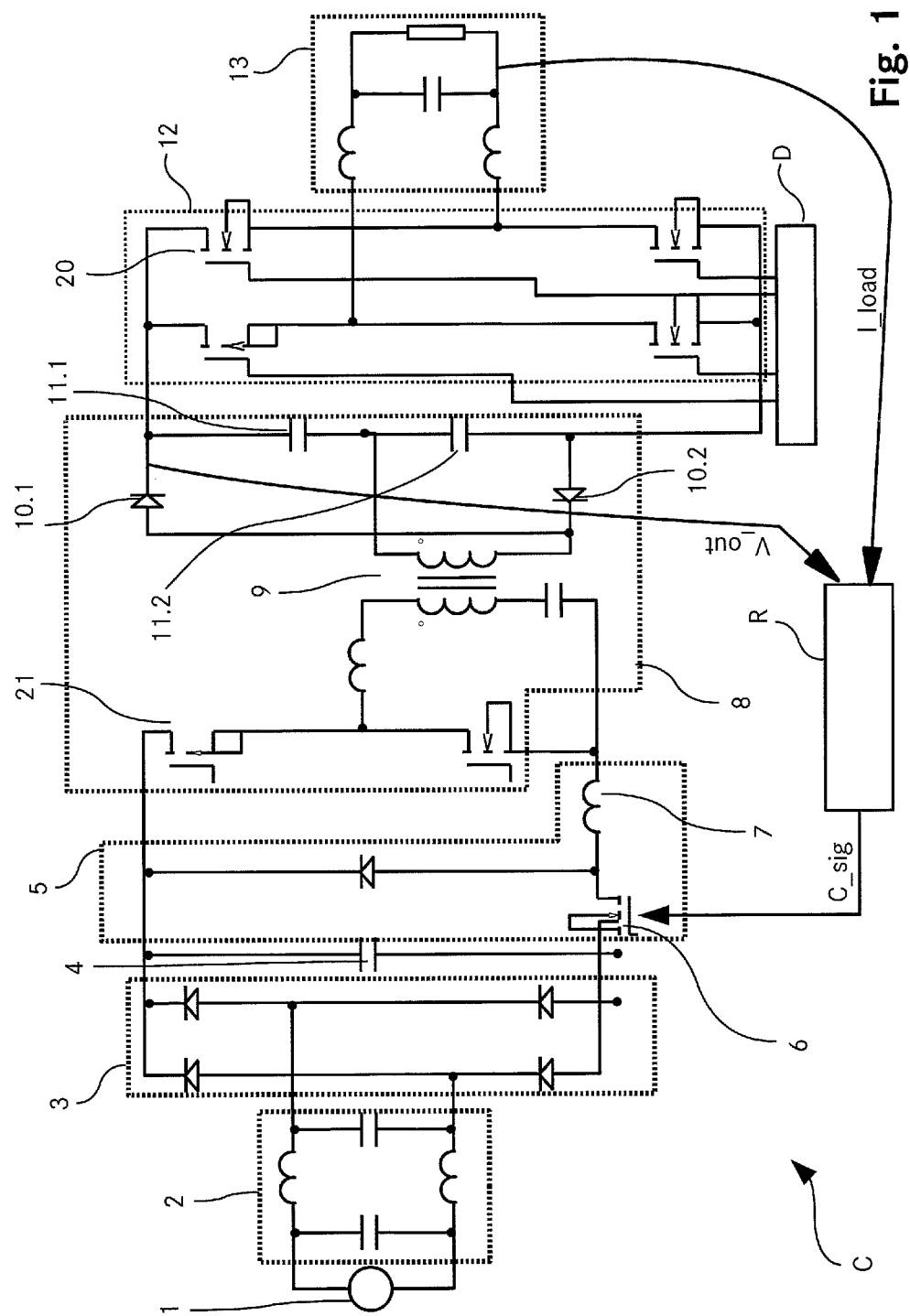
FIG. 1 A schematic wiring diagram of an AC-AC converter according to the invention.

A bridge rectifier 3 after the low pass filter 2 converts the filtered alternating sinusoidal voltage to a unidirectional rectified sine wave. The frequency of this unidirectional rectified sine wave is double the utility mains frequency.

Connected in parallel with the bridge rectifier 3 is a current supply capacitor 4 which provides the necessary high frequency current for the next stage of the AC-AC converter—the step down converter 5—by providing a continuously flowing input current.

The step down converter 5 comprises a step down switch 6 in the form of a transistor. The step down switch 6 is switching at much higher frequency compared to the frequency of the utility mains 1. For example, when the utility mains frequency is 50 Hz, then the step down switch 6 is typically switching at a frequency higher than 40 kHz and could typically be switching in the range of around 100 kHz and as high as 250 kHz. The step down inductor 7 helps to make sure that the continuous current is fed to the next stage of the AC-AC converter—the resonant half bridge 8.

Amongst other elements, the resonant half bridge 8 comprises a transformer 9. The transformer 9 is a high frequency type transformer providing the required isolation between the primary input circuit and the secondary output circuit of the AC-AC converter C. The resonant half bridge 8 and in particular the transformer 9 has a voltage doubler configuration comprising two doubler diodes 10.1, 10.2 and two doubler capacitors 11.1, 11.2 on the secondary side. In this way a tapped secondary winding of the transformer 9 is not needed and any imbalance that may be caused by different leakage inductances is avoided. The resonant half bridge 8 also comprises two high frequency switches 21 with fixed duty cycle maintained by a control circuit.

The doubler capacitors 11.1, 11.2 are of small capacitance—e. g. approximately 1 µF—for absorbing the high frequency current without disturbing the waveform of the unidirectional sine wave output voltage which is present at this point of the AC-AC converter C. This unidirectional sine wave output voltage is referenced to secondary ground.

At the next stage of the AC-AC converter C—the polarity changer 12 in the form of a bridge inverter—the unidirectional sine wave output voltage is converted to an unfiltered bidirectional sine wave output voltage having the same frequency as the bidirectional input sine wave. For this purpose, a mains-synchronized gate drive D is used to appropriately command four inverter transistors 20 of the polarity changer 12.

After being filtered by an output low pass filter 13 for reducing the common mode noise currents, the filtered bidirectional sine wave output voltage is fed to the load circuit.

FIG. 1 also shows a regulator R which connects the secondary side of the AC-AC converter C back to the primary side of the AC-AC converter C and which is configured to determine an appropriate control signal C_sig for the step down switch 6 of the step down converter 5 based on the unidirectional sine wave output voltage V_out and/or the load current I_load.

Figure 2:
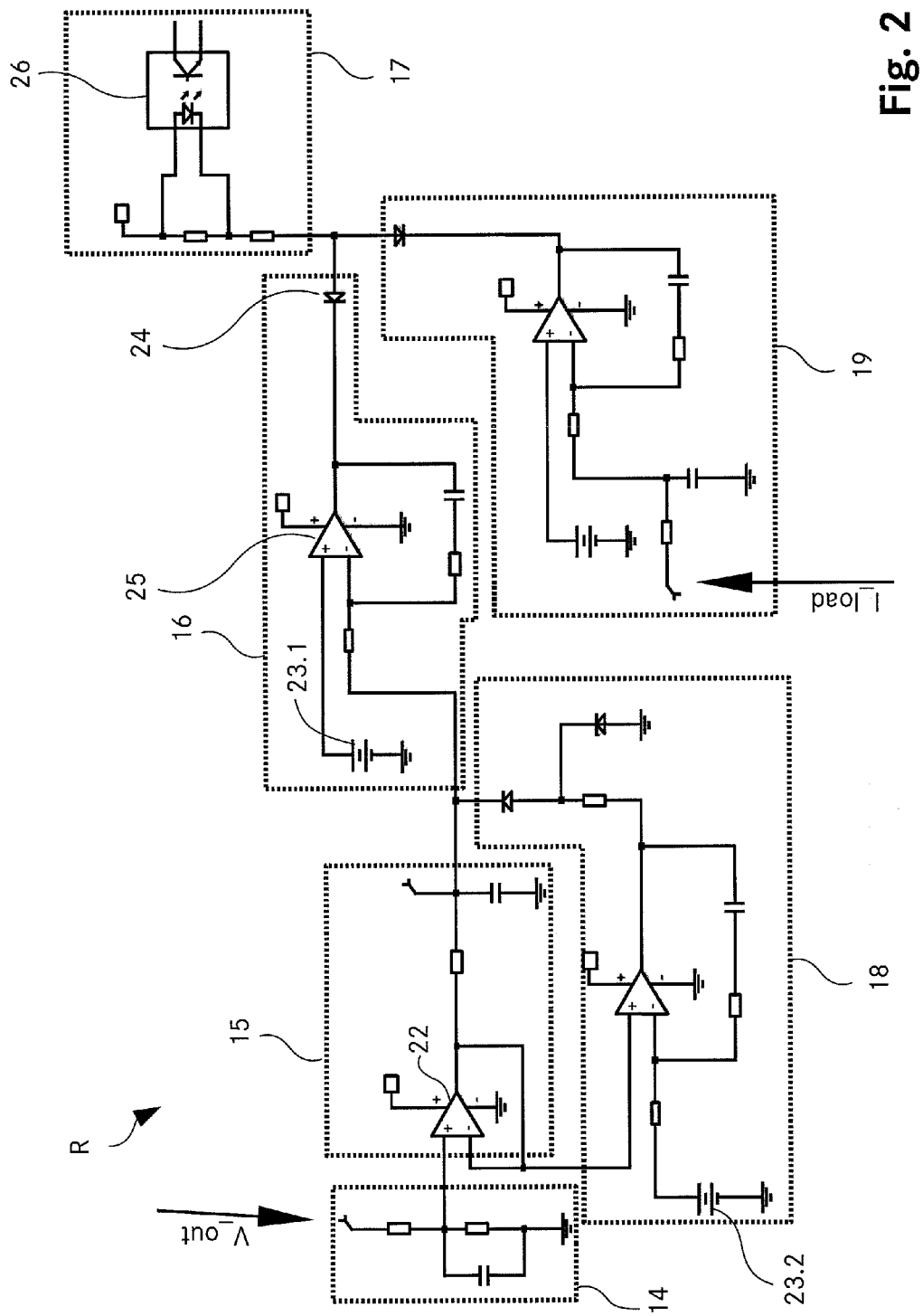
FIG. 2 A schematic wiring diagram of a regulator of an AC-AC converter according to the invention.
In the figures, the same components are given the same reference symbols.
Preferred Embodiments

FIG. 2 now shows a schematic wiring diagram of the regulator R already displayed in FIG. 1.

The unidirectional sine wave output voltage V_out (over the doubler capacitors 11.1, 11.2 in FIG. 1), which shall also be referred to as feedback voltage, is first step down to a smaller scale using a divider 14 formed by two resistors and a capacitor. The ground reference of this divider 14 is the same as the ground network for the reference voltage over the doubler capacitors 11.1, 11.2 in FIG. 1, i. e. secondary ground. The waveform of this reference voltage is only unidirectional but it is of half-sinusoidal form. AC link capacitors take the high frequency switching current. The objective of the regulator R is that voltage waveform over the doubler capacitors 11.1, 11.2 in FIG. 1, which is of the same shape as the bidirectional input sine wave supplied by the utility mains 1 (see FIG. 1), should be maintained at the output of the AC-AC converter. Only the amplitude of this voltage should be adjusted or regulated to a desired value, which is quite similar to what is done in a standard isolated variable type 50 Hz transformer. This reference voltage is already on the secondary output side of the AC-AC converter C and is isolated from the utility mains with double insulation (typically ~4 KV isolation voltage).

In order to regulate this voltage and to also keep its waveform intact, it is converted to a feedback DC voltage using an averaging circuit 15. This feedback DC voltage is then compared to a desired reference value in the voltage regulation circuit 16 and the error is used to regulate the duty cycle of step down switch 6 (see FIG. 1).

The averaging circuit 15 comprises an operational amplifier 22 as well as a resistance and a capacitor serving as filter components. The operational amplifier 22 forms a buffer circuit with unity gain and—together with the filtering components—converts the half sinusoidal reference voltage to an average DC voltage. The averaging circuit 14 can also be an active filter using an operational amplifier.

The voltage regulation circuit 16 is an operational amplifier formed by a voltage regulator 25, two resistances a capacitor, a diode 24, and a voltage reference 23.1. The voltage reference 23.1 can for example be a 2.5 V reference and a voltage divider circuit to produce a desired reference value for the voltage regulation circuit 16. The voltage regulation circuit 16 will regulate the output voltage of the AC-AC converter C to this reference value by comparing it with the average DC voltage at the output of the averaging circuit 15 and producing an error voltage.

This error voltage on the output of the voltage regulator 25 is transferred to the primary side of the AC-AC converter C using an opto-coupler circuit 17. Diode 24 isolates the voltage regulation circuit 16 from the opto-coupler circuit 17. The opto-coupler circuit 17 comprises an opto-coupler 26 and two resistances. The transistor part of the opto-coupler 26 on the primary side connects to the PWM control circuit. If the output voltage of the AC-AC converter C is higher than the reference value, then the voltage regulator 25 output voltage will be reduced to flow more current over the opto-coupler U1 and on the primary side. This effect will create smaller duty cycle for step down switch 6 thereby reducing the effect of increasing output voltage of the AC-AC converter C. The opposite logic applies when the output voltage of the AC-AC converter C is going below the reference value. In this case, the voltage regulator 25 output voltage will be increased creating a higher duty cycle for step down switch 6 and thereby allowing the output voltage of the AC-AC converter C to rise up until a balance is reached where the output voltage of the AC-AC converter C is same the reference value.

Since the regulator comprises an averaging circuit, the output voltage of the AC-AC converter C is regulated without losing its waveform by regulating its average value. This strategy works well for loads such as heating resistors or lamps with their resistances typically not changing very quickly over time. However, for loads such as printer power supplies, it may happen that after the printing of a page the load temporarily drops. This may cause an overshoot of the output voltage of the AC-AC converter C unless the regulator is fast reacting and able to bring the AC-AC converter into balance within a short time period. An overshoot may even activate the over-voltage condition. The averaging circuit typically has a long time constant so a fast change in the output voltage of the AC-AC converter C may not be immediately detected at the feedback pin of the voltage regulator 25. Hence, a fast reaction circuit 18 in parallel with the averaging circuit 15 is implemented in the regulator comprising an operational amplifier, a voltage reference 23.2, three resistances, a capacitor, a diode and a Zener-diode. The reference for fast reaction circuit 18 is set by the voltage reference 23.2 which is slightly higher than the reference for the output voltage the AC-AC converter C. The output of the fast reaction circuit 18 charges the capacitor of the averaging circuit 15 and helps the regulator R to react in a fast manner to load variations. So when the output voltage of the AC-AC converter C overshoots due to rapid load change, then the fast reaction circuit 18 will come into action and will prevent any overvoltage shutdown of the AC-AC converter C. Also, the averaging circuit 15 can be construed with different time constants depending on the load dynamics and on how fast the reaction from the regulator R has to be.

The AC-AC converter C is designed as per the load requirements and also needs to have a short circuit protection. As shown in FIG. 2, the regulator therefore comprises a current regulation circuit 19 comprising an operational amplifier, a voltage reference, three resistances, two capacitors and a diode. The load current I_load tapped at the output of the AC-AC converter C is fed into the current regulation circuit 19, is filtered and is converted to an average DC current. The current regulation circuit 19 runs a parallel loop to the voltage regulation circuit 16 and senses the load current of the AC-AC converter C. The current regulation circuit 19 uses the thus sensed current and regulates it to a fixed reference value. In case of an overload at the output of the AC-AC converter C the current regulation circuit 19 takes over the control from the voltage regulation circuit 16. The error value of the current regulator is used to reduce the duty cycle of the step down switch 6 on the primary side of the AC-AC converter C. In this way, the maximum allowed load current is maintained. Also, in case of a short circuit on the output, the AC-AC converter C shuts down the output without damaging any components. When the load current is below its maximum value, then the current regulation circuit 19 is not active and the duty cycle of the step down switch 6 is controlled by the voltage regulation circuit 16.

The AC-AC converter C is thus so designed that its output voltage has always the same frequency as the utility mains 1. A separate circuit, referred to as regulator R, is used to synchronize the output waveform of the AC-AC converter C with the input waveform of the utility mains 1. So both output and input of the AC-AC converter C are in phase and have the same frequency.

The invention is not limited to the embodiment described here, the scope of protection being rather defined by the claims.

| List of reference symbols | |
|---|---|
| 1 | Utility mains |
| 2 | Low pass filter |
| 3 | Bridge rectifier |
| 4 | Current supply capacitor |
| 5 | Step down converter |
| 6 | Step down switch |
| 7 | Continuity inductor |
| 8 | Resonant half bridge |
| 9 | Transformer |
| 10.1, 10.2 | Doubler diode |
| 11.1, 11.2 | Doubler capacitor |
| 12 | Polarity changer |
| 13 | Output low pass filter |
| 14 | Divider |
| 15 | Averaging circuit |
| 16 | Voltage regulation circuit |
| 17 | Opto-coupler circuit |
| 18 | Fast reaction circuit |
| 19 | Current regulation circuit |
| 20 | Inverter transistor |
| 21 | High frequency switch |
| 22 | Operational amplifier |
| 23.1, 23.2 | Voltage reference |
| 24 | Diode |
| 25 | Voltage regulator |
| 26 | Opto-coupler |
| D | Mains-synchronized gate drive |
| C | AC-AC converter |
| R | Regulator |

The invention claimed is:

1. An AC-AC converter comprising
a) a primary side.;
b) secondary side; and
c) a regulator, wherein
the regulator comprises:
d) a voltage regulation circuit configured to determine an error voltage based on an at least partially alternating feedback voltage fed into the regulator from the secondary side of the AC-AC converter and to supply this error voltage and/or an information about this error voltage to the primary side of the AC-AC converter, wherein
- e) an averaging circuit configured to determine an average DC voltage based on the at least partially alternating feedback voltage, and
- f) a fast reaction circuit configured to help the voltage regulation circuit in responding to rapid load changes, wherein the fast reaction circuit coupled in parallel with the averaging circuit to render a comparably long time constant of the averaging circuit less critical.

2. The AC-AC converter according to claim 1, wherein the fast reaction circuit is configured to help the voltage regulation circuit to react to rapid load changes in overshoot situations of the AC-AC converter.

3. The AC-AC converter according to claim 2, wherein an output of the fast reaction circuit is connected to an output of the averaging circuit and/or to an input of the voltage regulation circuit.

4. The AC-AC converter according to claim 1, wherein the regulator comprises a current regulation circuit configured to determine an error current based on a load current fed into the regulator from a secondary side of the AC-AC converter and to supply this error current and/or an information about this error current to a primary side of the AC-AC converter.

5. The AC-AC converter according to claim 4, wherein an output of the current regulation circuit is connected to an output of the voltage regulation circuit.

6. The AC-AC converter according to claim 1, wherein the regulator comprises an opto-coupler circuit for maintaining a galvanic isolation between the regulator and/or the secondary side of the AC-AC converter from the primary side of the AC-AC converter.

7. The AC-AC converter according to claim 1, wherein the AC-AC converter comprises a rectifier on its primary side.

8. The AC-AC converter according to claim 1, wherein the AC-AC converter comprises a polarity changer on its secondary side.

9. The AC-AC converter according to claim 8, wherein the polarity changer is mains-synchronized.

10. The AC-AC converter according to claim 1, wherein the AC-AC converter comprises a resonant half bridge.

11. The AC-AC converter according to claim 10, wherein the resonant half bridge comprises a high frequency transformer.

12. The AC-AC converter according to claim 10, wherein the resonant half bridge comprises a high frequency switch.

13. The AC-AC converter according to claim 10, wherein the resonant half bridge comprises a voltage doubler configuration on its secondary side and/or on the secondary side of the high frequency transformer.

14. The AC-AC converter according to claim 1, wherein the AC-AC converter comprises a step down converter with a step down switch and at least one of a continuity inductor and a step down diode.

15. The AC-AC converter according to claim 14, wherein an output of the regulator is connected to the step down switch such that the step down switch can be commanded by the regulator.

16. A method for operating the AC-AC converter according to claim 1, comprising:
- converting a bidirectional input sine wave to a unidirectional rectified sine wave,
- converting the unidirectional rectified sine wave to a regulated unidirectional sine wave voltage wherein a step down converter is regulated by a regulator which determines an error voltage depending on a reference voltage tapped on the secondary side of the AC-AC converter and a voltage reference,
- transforming the regulated unidirectional sine wave voltage to a unidirectional sine wave output voltage with variable amplitude, and
- inverting the unidirectional sine wave output voltage to an unfiltered bidirectional sine wave output voltage having the same frequency as the bidirectional input sine wave.

17. The AC-AC converter according to claim 2, wherein the regulator comprises a current regulation circuit configured to determine an error current based on a load current fed into the regulator from a secondary side of the AC-AC converter and to supply this error current and/or an information about this error current to a primary side of the AC-AC converter, preferably only in overload situations.

18. The AC-AC converter according to claim 3, wherein the regulator comprises a current regulation circuit configured to determine an error current based on a load current fed into the regulator from a secondary side of the AC-AC converter and to supply this error current and/or an information about this error current to a primary side of the AC-AC converter, preferably only in overload situations.

19. The AC-AC converter according to claim 2, wherein the regulator comprises an opto-coupler circuit for maintaining a galvanic isolation between the regulator and/or the secondary side of the AC-AC converter from the primary side of the AC-AC converter.

20. The AC-AC converter according to claim 3, wherein the regulator comprises an opto-coupler circuit for maintaining a galvanic isolation between the regulator and/or the secondary side of the AC-AC converter from the primary side of the AC-AC converter.

21. The AC-AC converter according to claim 1, wherein the fast reaction circuit is implemented in parallel with the averaging circuit.

22. The AC-AC converter according to claim 1, wherein the fast reaction circuit comprises an operational amplifier, a voltage reference, three resistances, a capacitor, a diode and a Zener-diode.

23. A Method for operating an AC-AC converter, comprising:
- converting a bidirectional input sine wave to a unidirectional rectified sine wave;
- converting the unidirectional rectified sine wave to a regulated unidirectional sine wave voltage wherein a step down converter is regulated by a regulator which determines an error voltage depending on a reference voltage tapped on the secondary side of the AC-AC converter and a voltage reference;
- transforming the regulated unidirectional sine wave voltage to a unidirectional sine wave output voltage with variable amplitude; and
- inverting the unidirectional sine wave output voltage to an unfiltered bidirectional sine wave output voltage having the same frequency as the bidirectional input sine wave.

* * * * *